United States Patent

[11] 3,599,302

[72] Inventor Edmund C. Dudek
 St. Charles, Ill.
[21] Appl. No. 776,556
[22] Filed Nov. 18, 1968
[45] Patented Aug. 17, 1971
[73] Assignee The Singer Company
 New York, N.Y.

[54] INTEGRAL BIT SHARPENER FOR POWER TOOLS
 2 Claims, 3 Drawing Figs.
[52] U.S. Cl. ................................................. 29/26
[51] Int. Cl. .......................................... B23b 45/02
[50] Field of Search ................................... 29/26.1,
 26.2; 51/219, 219 PC

[56] References Cited
UNITED STATES PATENTS
1,475,153 11/1923 Athenas ...................... 29/26 (.2)
2,109,308 2/1938 Adams ........................ 51/219 PC
2,800,755 7/1957 Perra .......................... 51/219 X

*Primary Examiner*—Andrew R. Juhasz
*Assistant Examiner*—F. R. Bilinsky
*Attorneys*—Marshall J. Breen, Chester A. Williams, Jr. and Harold Weinstein ABSTRACT: This disclosure relates to a power tool having an integral bit or implement sharpener which permits a bit to be sharpened by the power tool whenever the need arises. One example of this would be a portable power drill in which the drill or implement is normally driven by the electric motor mounted in the housing. A grinding wheel is connected at the opposite end of the motor so that whenever the bit needs sharpening it is simply removed from its driven connection or chuck and placed in a support assembly for manual turning in contact with the grinding wheel. Also, cam means are provided on the support assembly whereby the proper rake angle for the cutting edge being sharpened will be maintained. The support assembly provides for aligning for the axis of the drill with respect to the grinding wheels surface at a predetermined surface angle and coacts with the cam means so as to produce the desired rake angle for the cutting edge in question.

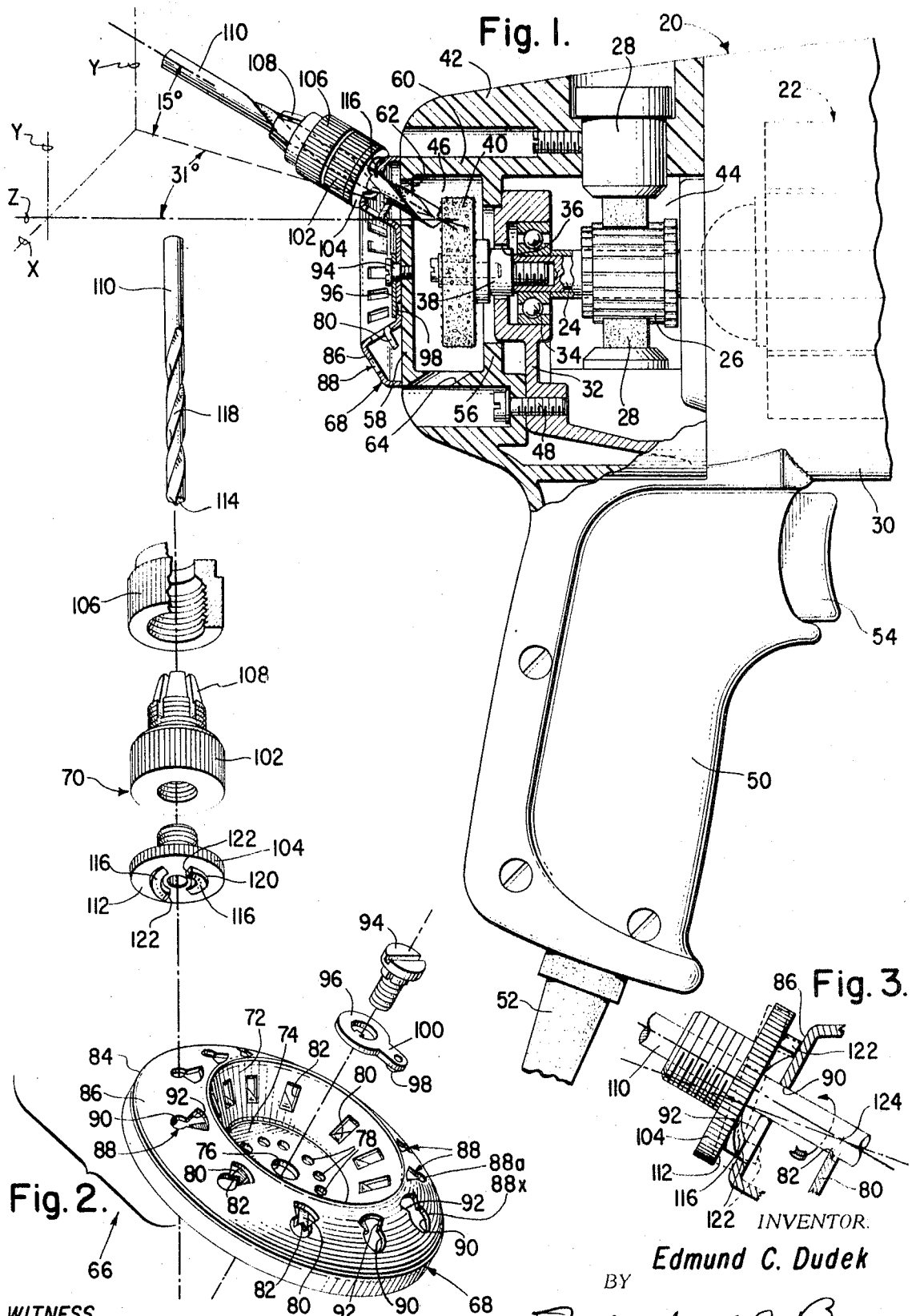

3,599,302

INTEGRAL BIT SHARPENER FOR POWER TOOLS

BACKGROUND OF THE INVENTION

In the prior art the bit is carried in a chuck during normal drilling operation, and in order to sharpen the bit it was removed from the chuck so that a grinding wheel could be mounted to said chuck and thereafter special alignment and support means would be connected to the tool or a vice for contacting the grinding wheel at the desired angle, but it was necessary to make a variety of manual settings in order to adjust the support and alignment means. Even then operator skill was a necessary prerequisite in obtaining the proper rake angle. Of course, a bench grinder with special fixture could also be used to sharpen the tool bit or implement.

SUMMARY OF THE INVENTION

In accordance with the present invention the novel portable electric tool is provided with a detachable driven implement at one end and an integral implement sharpener at the other end. The tool has a housing in which an electric motor is mounted with the shaft thereof extending outwardly of the housing to drive the implement. A transverse wall is formed in the housing adjacent one end of the motor. A grinding means is connected to the motor shaft outwardly of the transverse wall through which the shaft extends. A support means is connectable to the housing to carry the implement into contacting engagement with the grinding means so as to sharpen said implement. In addition, the grinding means may be disposed in a chamber means formed in the housing, and the support means may include cam members to control the degree of cutting.

It is therefore an object of the present invention to provide an improved integral bit sharpener for power tools which avoids the prior art disadvantages; which is simple, economical and reliable; which is useable in a portable power tool, such as a hand held drill; which includes a grinding means disposed in a chamber of the power tool's housing; which includes a support means to align the implement for engagement for the grinding wheel; which includes support means having interacting cam faces; which includes a support means with a plurality of different size openings which corresponds to the various bit sizes; and which includes a turnable bit holder in the support means and coacting stops to prevent overturning thereof.

Other objects and advantages will be apparent from the following description of one embodiment of the invention and the novel features will be particularly pointed out hereinafter in the claims.

BRIEF DESCRIPTION OF THE DRAWINGS

This invention is illustrated in the accompanying drawings in which:

FIG. 1 is a side elevational view, partly in section, of a power tool such as a portable drill embodying the present invention.

FIG. 2 is an exploded view of the support means of the present invention including the bit, the bit holder, the wobble-producing cam disc and the turnable support plate.

FIG. 3 is an enlarged schematic representation of the wobble-producing cam assembly.

DESCRIPTION OF THE INVENTION

A conventional power tool, such as a portable power drill 20 is shown in FIG. 1 embodying the present invention. The drill 20 has an electric motor 22 including an armature shaft 24 which carries a commutator 26, engaged by a brush assembly 28. The motor 22 is mounted in a housing 30 in which is formed an opened web transverse partition wall 32 for journaling the rear end of the shaft 24 in a press-fitted roller bearing 34. The transverse partition wall 32 has a central opening 36 through which a stub shaft 38, carrying a grinding wheel 40, interconnects with the armature shaft 24 to rotate therewith on operation of the motor 22. The end portion of the housing 30 is enclosed by a cover member 42 which serves to divide the housing into a motor chamber 44 and a grinding chamber 46. The cover member 42 may be connected to the housing by screws 48 threadedly connected into tapped holes in the partition wall 32. A pistol-grip handle 50 is formed integrally with the cover member 42 and receives an electric cord 52 which is connected through a trigger switch 54 to the motor 22 in the usual manner.

The front end of the armature shaft 24 (not shown) is adapted to drive a suitable bit or implement which comes into engagement with the work.

The grinding chamber 46 is completely separated from the motor chamber 44 by an annular radially inwardly extending flange 56 which contacts and closes any of the web openings in the transverse wall partition wall 32. A vertical rear wall 58 has its outer periphery turned to extend axially as an annular wall 60 which defines a cup shape portion of the cover member 42 above the handle 50. The flange 56 extends from the wall 60 to complete the chamber 46. An aperture 62 is formed in the upper portion of the rear wall 58 to provide access into the grinding chamber 46, while a second aperture 64 is formed at the bottom of the annular wall 60 to permit discharge of any debris therein.

A support fixture or assembly 66 is illustrated in FIGS. 1 and 2 and includes a support plate 68 and an interacting holder member 70 for the drill or implement.

The support plate 68 has a cup-shaped central recess 72 with a flat bottom 74 having a central aperture 76 about which a plurality of smaller radially spaced apertures 78 are formed. The upwardly sloping sides of the cup-shaped recess 72 have been punched to form a plurality of radially spaced fulcrum supports or fingers 80 which extend from the apertures 82 outwardly from the recess 72, as best shown in FIGS. 1 and 3. The fulcrum support 80 extends substantially perpendicular to the inclined wall of the cupped-shaped recess 72 and is notched at its outer edge 82. The outer edge 84 of the support plate 68 is turned back and extends outwardly from the recess 72 to form an annular support surface 86 the outer edge of which is turned axially to terminate at the plane of the flat bottom 74. The major portion of the support surface 86 extends in an inclined plane substantially perpendicular to the fulcrum support 80. The support surface 86 has a plurality of circumferentially spaced keyholelike openings 88 with a circular outer portion 90 and an inner portion 92 having flared side edges. The size of the openings 88 increases in a counterclockwise direction from the smallest opening designated 88a to the largest opening designated 88x. Each opening 88 has a corresponding fulcrum support 80 and placement aperture 78. The support plate 68 is connected to the rear wall 58 of the grinding chamber 46 by a shoulder screw 94. A retainer 96 is nonturnable keyed to the shoulder of the screw 94 to yieldable place a button 98, connected to the end of a spring finger 100 thereof in one of the selecting apertures 78 and thereby retain the selected opening 88 in superposition to the aperture 62. If a different size opening is desired, the operator only need turn the support plate 68 about the axis of the screw 94, which coincides with the axis of the armature shaft 24, and rotate the same until the desired opening 88 is placed in superposition to the aperture 62. The button 98 is yieldably removed from or engaged in the various apertures 78 so that though it will hold the support plates 68 securely in selected position, it will also permit easy turning of the support plate 68.

The holder member 70 for the drill bit or implement may be composed of a plurality of interconnected components and includes a chuck member 102, the inner end of which has a cam disc 104 internally threaded thereto and the outer end of which has a locking sleeve 106 externally threaded thereto, the turning of which will cause the chuck fingers 108 to clamp upon the drill bit. The outer circumferences of the chuck member 102, the cam disc 104 and the locking sleeve 106 are serrated for ease in turning. A drill bit 110 as illustrated in FIG. 2, is passed into the central aligned opening of the components of the holder member 70 to be clamped thereto However, in order to insure a proper axial length extends beyond the cam disc 104, the implement holder member 70 has the front surface 112 of the cam disc 104 placed into contact with the support surface 86 to thereby introduce the drill bit 110 into the grinding chamber 46 after passing through the opening 88 and the aperture 62. If the outward extension of the implement 110 is too long proper contact will not be possible between the front surface 112 and the support surface 86, or conversely if the outward extension of the implement is too short then the tip 114 of the implement 110 will not come in contact with the grinding surface of the grinding wheel 40. In either event the operator will loosen the locking sleeve 106 to adjust the outward extension of the implement 110 until proper contact is made between the tip 114 and the grinding wheel 40. The tip 114 of the implement 110 has a pair of cutting edges and a pair of trailing edges which are to be set off from each other by a preselected "rake angle". The term rake angle refers to the inclination away from the cutting edge in the direction of the trailing edge so as to create a clearance for the removal of the chip material. Unless the rake angle is set at an optimum, excessive wear or overheating of the tip 114 results, in addition to insufficient or poor quality drilling.

In order to obtain the desired rake angle it is necessary to align the drill bit 110 and turn the same by means of a controlled wobble about a predetermined point or fulcrum. The coacting front surface 112 and support surface 86 and its corresponding fulcrum support 80 have been designed and sized so as to set the axis of the drill bit 110 with respect to the grinding surface of the grinding wheel 40 at a preferred angle. This angle is diagrammatically illustrated in FIG. 1 as a compound angle which presents the tip at an angle of 15° to the horizontal plane and 31° to the vertical plane. Of course, if another angle is desired then the components may be suitably modified to obtain the same. The front surface 112 of the cam disc 104 may conveniently carry one cam 114 corresponding to each of the cutting edges of the drill bit 110.

The flutes 118 of the drill bit 110 are twisted as shown for normal clockwise drilling operation, and therefore, the tip 114 of the drill bit 110 will be sharpened by a clockwise turning motion. Each of the cams 116 is formed diametrically opposite from the other, and rises from the front surface 112 in a counterclockwise direction to increasingly project forward along a radial line which will set it within the bounds of the flared portion 92 of the openings 88 on the drill bit 110 being inserted into the circular portion 90 thereof. The cam will have an arcuate raised side 112 projecting outwardly from the front surface 112 which terminates in an axially slabbed edge 122. The cutting edge of the drill bit 110 to be sharpened is placed in the holder member 70 corresponding to the lower of the slabbed edges 122 whereby on the insertion of the drill bit 110 into contacting engagement with the grinding wheel 40 said slabbed edge 122 will be placed adjacent the near side, as viewed in FIG. 1 of the side flared portion 92 of the opening 88. In this position, turning of the holder member 70 will cause the slabbed edge 122, as shown in FIG. 3 to descend into the portion 92, with the arcuate side 122 riding on the near flared side thus producing a "wobble" about the point 124 immediately above the fulcrum support 80. During the turning of the holder member 70 the upper cam 116 rides along the support surface 86. The controlled wobble results in extending the drill bit 110 into increasing engagement with the grinding wheel 40 to permit a heavier cut as the bit is cut toward the trailing edge so as to produce a desired rake angle for the cutting edge being sharpened. The flared sides of the portion 92 may be spaced so that upon reaching the trailing edge of the surface being sharpened the slabbed edge 122 of the cam 116 will abut the opposite flared side. Upon reaching the stop side of the portion 92 the operator will withdraw the holder member 70 and turn it to the position for sharpening the second cutting edge which in the preferred embodiment means that the holder member 70 will be in a position 180° from that of the sharpening operation of the first cutting edge and thereafter will repeat the operation for the second cutting edge. Though no markings have been shown it will be apparent that either or both the holder member 70 or the support plate 68 may be suitably indexed to insure proper registration of the cutting edge of the drill bit being sharpened.

The openings 88 will be of sufficient size to permit the wobble effect of the drill bit 110 therein and may be marked to indicate the size drill which may be accommodated in the various openings.

The cam disc 104 may be integrally formed in the rear of the chuck member 102, or may be of different size, shape or cam configuration than that shown in the drawings so as to produce the desired rake angle in axial alignment of the drill bit 110.

The operator, upon completion of the drill bit sharpening operation may remove the holder member 70 from the cover member 42, and in turn remove the drill bit 110 from the holder member 70 for resumption of the normal operation of the drill 20 upon connecting the drill bit 110 to the front end thereof. The grinding debris caused by the sharpening operation will be discharged from the aperture 64.

In summary, the present invention permits the power tool to be used to sharpen its own tool implements whether said tool to be a portable or fixed type, by means of a novel housing and cam arrangement, and the use of a grinding wheel permanently mounted to the armature shaft of the motor.

It will be understood that various changes in the details, materials, arrangements of parts and operating conditions which have been herein described and illustrated in order to explain the nature of the invention may be made by those skilled in the art within the principles and scope of the invention as expressed in the claims.

I claim:

1. A power tool in combination with a bit sharpener comprising:
   a. a housing having wall means therein forming a motor chamber and a grinding chamber,
   b. a motor connected in the motor chamber,
   c. a grinding means disposed in the grinding chamber, and operatively connected to be driven by the motor,
   d. an aperture formed in the wall means of the grinding chamber adapted to permit the bit to engage the grinding means,
   e. an annular support plate having a plurality of circumferentially spaced openings of successively increasing size, said plate being yieldably connected to the housing in spaced relation to the aperture whereby one of the openings is selectively positioned adjacent the aperture of the wall means,
   f. alignment means formed axially inwardly of each of the openings to support the bit and to align the bit along a predetermined axis with respect to the grinding means,
   g. each of the openings in the support plate defining a substantially keyholelike shape,
   h. a bit holder means having two cams formed on the surface thereof adapted to hold the bit,
   i. each of the cams being arcuate and sloping axially upwardly from a diametrically flat portion to a diametrically raised portion,
   j. each of the cams, upon turning of the bit holder means, controlling the grinding of one of the cutting edges of the bits to obtain a predetermined rake angle, and
   k. the cam corresponding to the cutting edge being sharpened descending increasingly descent into the keyhole opening upon the turning of the bit holder means until said cam abuts the edge of said opening.

2. The combination claimed in claim 1 wherein:
   a. the wall means having the aperture therein is disposed perpendicular to the axis of the grinding means on the side thereof remote from the motor,
   b. the support plate is connected to the wall means axially outwardly therefrom and substantially parallel thereto, and
   c. the axis of the bit holder means intersecting a face of the grinding wheel which face lies parallel to and adjacent to the wall means, whereby the bit carried in the bit holder means will contact the face for sharpening.